(12) United States Patent
Axelrod

(10) Patent No.: US 7,691,315 B2
(45) Date of Patent: Apr. 6, 2010

(54) INJECTION MOLD HAVING CAVITIES IN SERIES

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 1054 days.

(21) Appl. No.: 11/184,050

(22) Filed: Jul. 18, 2005

(65) Prior Publication Data

US 2007/0013104 A1    Jan. 18, 2007

(51) Int. Cl.
B29C 45/03 (2006.01)
(52) U.S. Cl. .............................. 264/328.8; 264/328.12; 425/542; 425/588; 426/512
(58) Field of Classification Search ................ 426/512, 426/513, 515; 425/572, 573, 542, 553, 588; 264/297.2, 328.1, 328.8, 328.12, 157
See application file for complete search history.

(56) References Cited

U.S. PATENT DOCUMENTS

| | | | | | |
|---|---|---|---|---|---|
| 742,245 | A | * | 10/1903 | Simon | ......................... 264/330 |
| 2,541,592 | A | * | 2/1951 | Lictaert | ....................... 425/145 |
| 2,570,433 | A | * | 10/1951 | Dodge | ......................... 425/561 |
| 3,871,334 | A | | 3/1975 | Axelrod | ..................... 119/29.5 |
| 4,439,390 | A | * | 3/1984 | Abramov et al. | ......... 264/297.2 |
| 4,513,014 | A | | 4/1985 | Edwards | ...................... 426/132 |
| 4,557,219 | A | | 12/1985 | Edwards | ..................... 119/29.5 |
| 4,711,773 | A | | 12/1987 | Mesters et al. | .............. 423/655 |
| 4,812,116 | A | | 3/1989 | Abrams | ....................... 425/547 |
| 4,983,110 | A | | 1/1991 | Yoshida et al. | .............. 425/116 |
| 5,169,655 | A | | 12/1992 | Von Holdt, Sr. | ............. 425/547 |
| 5,200,212 | A | | 4/1993 | Axelrod | .......................... 426/2 |
| 5,240,720 | A | | 8/1993 | Axelrod | .......................... 426/2 |
| 5,409,362 | A | | 4/1995 | Neu | ............................ 425/116 |
| 5,476,069 | A | | 12/1995 | Axelrod | ...................... 119/709 |
| 5,750,153 | A | | 5/1998 | Shibata | ....................... 425/116 |
| 5,773,038 | A | | 6/1998 | Hettinga | ..................... 425/145 |
| 5,786,383 | A | | 7/1998 | Clement | ..................... 514/633 |
| 5,792,406 | A | * | 8/1998 | Wada et al. | ................. 264/157 |
| 5,827,565 | A | | 10/1998 | Axelrod | ...................... 426/623 |
| 5,941,197 | A | | 8/1999 | Axelrod | ...................... 119/710 |
| 6,093,427 | A | * | 7/2000 | Axelrod | ...................... 426/104 |

(Continued)

FOREIGN PATENT DOCUMENTS

JP    57203532 A    12/1982

OTHER PUBLICATIONS

Rosato, Injection Molding Handbook, 3rd edition, 2000, Kluwer Academic Publishers, pp. 733-735.*

(Continued)

Primary Examiner—Jill L Heitbrink
(74) Attorney, Agent, or Firm—Grossma, Tucker, Perreault & Pfleger, PLLC

(57) ABSTRACT

An apparatus and process are provided for molding articles such as animal chew toys by providing mold cavities in series. Plasticated resin may flow through a runner system and gate to substantially fill a first cavity and then through a sub-gate to fill a second cavity of which may include a shape that is similar to the first cavity shape. This may result in substantially reduced offal, e.g. trim waste, in the molding process.

9 Claims, 3 Drawing Sheets

U.S. PATENT DOCUMENTS

| | | | |
|---|---|---|---|
| 6,093,441 A | 7/2000 | Axelrod | 426/623 |
| 6,110,521 A | 8/2000 | Axelrod | 426/549 |
| 6,126,978 A | 10/2000 | Axelrod | 426/285 |
| 6,159,516 A | 12/2000 | Axelrod et al. | 426/456 |
| 6,180,161 B1 | 1/2001 | Axelrod | 426/623 |
| 6,200,616 B1 | 3/2001 | Axelrod et al. | 426/285 |
| 6,274,182 B1 | 8/2001 | Axelrod et al. | 426/132 |
| 6,360,693 B1 * | 3/2002 | Long, III | 119/707 |
| 6,450,798 B1 | 9/2002 | Choi et al. | 425/572 |
| 6,455,083 B1 * | 9/2002 | Wang | 426/104 |
| 6,641,758 B1 * | 11/2003 | Arentsen et al. | 264/51 |
| 6,649,447 B1 | 11/2003 | Chang et al. | 438/112 |
| 6,791,167 B2 | 9/2004 | Hayashi et al. | 257/667 |
| 6,916,497 B2 | 7/2005 | Axelrod et al. | 426/132 |
| D514,278 S * | 2/2006 | Weinberg | D1/199 |
| 2003/0087008 A1 * | 5/2003 | Axelrod | 426/104 |
| 2004/0137118 A1 | 7/2004 | Axelrod | 426/132 |
| 2004/0170733 A1 | 9/2004 | Axelrod | 426/516 |

OTHER PUBLICATIONS

Governing Principles of Multi-Material Molding. Retrieved on Apr. 13, 2005, using Internet <URL:http://www.isr.umd.edu/Labs/CIM/M3T/Chapter2.htm>. 10 pages.

Schmidt, Lawrence R. Basic Fluid Flows and Flow Phenomena. Society of Plastic Engineers.

* cited by examiner

INJECTION MOLD HAVING CAVITIES IN SERIES

FIELD OF THE INVENTION

The present invention relates to an apparatus and a process for forming an animal chew or toy, and more particularly, to molding said chew in a multi-cavity mold wherein the cavities are arranged in series.

BACKGROUND OF THE INVENTION

In U.S. Pat. No. 5,827,565 it is pointed out that most dogs enjoy chewing on a flavored object although preferences vary as to the hardness. Some dogs like to chew on very hard materials such as cow bones, wood, nylon, while others prefer softer chews such as polyurethane or rubber while still others favor freeze dried snacks. Some dogs, due to their age, may not be able to chew on very hard substances. Young dogs have insufficiently developed teeth, while old dogs may have diseased gums or may have lost some of their teeth.

Applicants' assignee, T.F.H. Publications Inc., has previously developed an edible dog chew that is wholly digestible, nutritious and maintains a texture or hardness which is individually adjustable by the application of heat to suit a wide variety of a dog's preferences or needs. Such dog chews utilize a mixture containing primarily casein and are described in U.S. Pat. Nos. 5,200,212 and 5,240,720.

In U.S. Pat. No. 5,827,565, owned by the common assignee of this Application, there is disclosed a process for making a heat expandable dog chew comprised primarily of potato starch granules and an attractant which may be injection molded to form the chew. Attractants recited include chicken powder, liver powder, ham, turkey, beef and or fish. Natural vegetable additives such as spinach or carrots also may be added. The resultant mixture is molded under heat and pressure into a desired form, such as a dog bone. The dog bone so produced can be modified in texture or hardness by subsequent heating, preferably in a microwave oven.

In U.S. Pat. No. 6,126,978, which is a continuation-in-part of U.S. Pat. No. 5,827,565, and which is owned by the common assignee of this Application, there is disclosed a dog chew having natural fruit flavor to increase the dog's appetite for such chew. Such fruit flavored dog chew may also include natural food coloring to enhance the attractiveness of the chew to the dog owner. The food coloring may also correspond to the fruit flavor, and the dog chew disclosed therein may also embody a breath sweetener for a dog such as mint, spearmint, peppermint or wintergreen and may also include parsley. The preferred form of such edible chew maintained the basic ingredient of a heat-expandable starch, such as potato starch. Fruit flavoring may be added to the granules of a mixture of potato starch, water and calcium carbonate along with natural fruit flavorings.

Attention is also directed to the following United States Patents and co-pending applications, commonly owned by the assignee herein: U.S. Pat. No. 5,476,069; U.S. patent application Ser. No. 08/923,070 filed Sep. 3, 1997, entitled "Vegetable Based Dog Chew" now U.S. Pat. No. 6,093,427; U.S. patent application Ser. No. 08/738,423 filed Oct. 25, 1997, entitled "Edible Dog Chew" now U.S. Pat. No. 5,827,565; U.S. patent application Ser. No. 08/784,834 filed Jan. 17, 1997, entitled "Carrot-Based Dog Chew" now U.S. Pat. No. 5,941,197; U.S. patent application Ser. No. 08/888,611 filed Jul. 7, 1997, entitled "Vegetable Dog Chew" now abandoned; U.S. patent application Ser. No. 09/114,872 filed Jul. 14, 1998, entitled "Heat Modifiable Edible Dog Chew" now U.S. Pat. No. 6,180,161; U.S. patent application Ser. No. 09/138,804 filed Aug. 21, 1998, entitled "Improved Edible Dog Chew" now U.S. Pat. No. 6,126,978; U.S. patent application Ser. No. 09/116,070 filed Jul. 15, 1998, entitled "Wheat & Casein Dog Chew With Modifiable Texture" now U.S. Pat. No. 6,110,521; and U.S. patent application Ser. No. 09/116,555, filed Jul. 15, 1998, entitled "Heat Modifiable Peanut Dog Chew", now U.S. Pat. No. 6,093,441. In addition to such patents and applications, attention is also directed to the art cited in said patents and applications, as such art relates to the field of molded starch products.

In addition, the prior art has recently grown considerably to include a variety of other disclosures directed at flavored pet products. For example, U.S. Pat. No. 5,786,383 entitled "Use of Valerian Plant and/or Root as a Scent-Attractant for Stimulating Canines and Felines". This patent discloses the use of the herb/plant Valerian in all of its forms whether whole or in part, for use in food product, in such a manner that the natural aroma emitted by the Valerian plant will act as a scent/attractant for dogs and cats.

Other earlier examples of such products are disclosed in U.S. Pat. No. 3,871,334 to Axelrod (nylon substrate containing liquid flavor and odor components) and U.S. Pat. No. 4,711,773 to Axelrod (polyurethane toy containing aqueous-based flavor and odor components). U.S. Pat. Nos. 4,557,219 and 4,513,014 to Edwards disclose the use of flavorings in a molded polyurethane chew objects.

With regards to the processes for forming such dog chews or toys, thermoplastic (plastication) processing is well known. U.S. Pat. No. 5,827,565, entitled "Process For Making An Edible Dog Chew", and U.S. Pat. No. 6,159,516, entitled "Method Of Molding Edible Starch", both commonly assigned to the assignee of the present invention and included herein by reference in their entirety, describe molding conditions for making such chews. Similarly, U.S. Pat. No. 6,274,182, entitled "Animal Chew", also commonly assigned and included herein by reference, describes process conditions for injection molding starch-based animal chews, while U.S. Pat. No. 6,200,616, also entitled "Animal Chew", is directed at an animal chew made from molded fruit chips by injection or compression molding.

In addition, U.S. Pat. No. 7,087,260, entitled "Animal Chew Toy With Flossing Ribs/Projections", and U.S. Pat. No. 6,916,497, entitled "Health Chew Toy", both commonly assigned to the assignee of the present invention and included herein by reference in their entirety, are directed at forming chews/toys by injection molding.

U.S. Pat. No. 7,063,868, entitled "Method Of Removing Molded Natural Resins From Molds Utilizing Lifter Bars", commonly assigned to the assignee of the present invention and included herein by reference it its entirety, describes a multi-cavity injection mold which further includes an ejector plate including a lifter bar for removing molded natural resin parts from the multi-cavity mold.

Accordingly, it is an object herein to improve further upon Applicants' earlier disclosures regarding animal chews and methods of forming such using thermoplastic molding processes employing multi-cavity molds. Further, it is an object of the present invention to form a chew or animal toy in a multi-cavity mold wherein the cavities to form said chew are arranged in series, thereby reducing the amount of regrind or offal produced. This may result in a more efficient molding process operating at lower cost.

SUMMARY OF THE INVENTION

In a first exemplary embodiment, the present invention is directed at a method of molding resin, comprising providing a mold having a plurality of cavities, wherein the mold includes two mold parts which may be opened and closed. This may be followed by providing a resin and plasticating the resin in, e.g., a heated injection molding machine. This may be followed by providing a runner system which fluidly connects the injection molding machine with a first cavity through a gate and providing a sub-gate between the first cavity and a second cavity. The first cavity may have a width "$w_1$" and height "$h_1$" and a "$(w/h)_1$" ratio of about 0.33-3.0 and the second cavity may have a width "$w_2$" and height "$h_2$" and a "$(w/h)_2$" ratio of about 0.33-3.0. This may be followed by injecting the resin through the runner system and into the first cavity and continuing to inject resin through the sub-gate into the second cavity and cooling the resin thereby forming a molded resin.

In a second exemplary embodiment the present invention is directed at a mold for sequentially forming a plurality of animal chew toys, the mold comprising a first mold part and a second mold part opposite to and in mating alignment with the first mold part so as to define a plurality of mold cavities connected by a runner system for receiving plasticated resin from a molding machine. The plurality of cavities includes at least a first cavity and a second cavity having a common axial centerline. The first cavity may have a width "$w_1$" and height "$h_1$" and a "$(w/h)_1$" ratio of about 0.33-3.0 and the second cavity may have a width "$w_2$" and height "$h_2$" and a "$(w/h)_2$" ratio of about 0.33-3.0. The runner system may comprise a main runner and at least one gate capable of feeding the first cavity. The first cavity and said second cavity may be located in series along a common axial centerline and the first cavity and the second cavity may be fluidly connected by a sub-gate.

BRIEF DESCRIPTION OF THE DRAWINGS

Advantages of the present invention will be apparent from the following description of exemplary embodiments, which description should be considered in conjunction with the accompanying drawings, wherein.

DESCRIPTION OF THE PREFERRED EMBODIMENTS OF THE INVENTION

Figure 1:
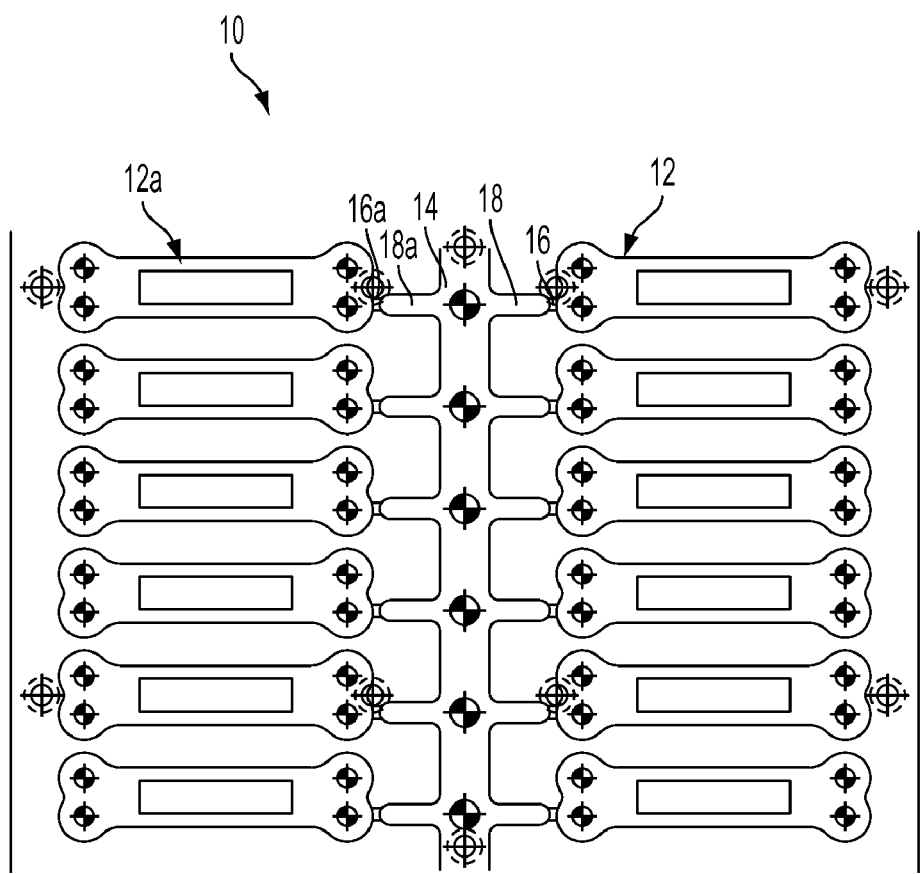
FIG. 1 illustrates a plan view of a portion of an exemplary mold as known in the art.

The present invention is directed at a method of molding natural resins, comprising supplying a mold with a mold cavity, wherein said mold includes a plurality of cavities, some of those cavities being arranged in series in order to reduce the amount of waste, regrind or offal that may be produced in the molding of animal chews or toys. A natural resin may be provided having a moisture content of about 1-40% by weight, wherein the resin may be selected from the group consisting of casein, starch, such as potato starch or wheat starch as well as vegetable matter, comminuted rawhide, collagen, proteins, wheat gluten, simple or complex carbohydrates, and mixtures thereof. Such natural resins with said moisture content may then be introduced and heated in a heated injection molding machine and injected into said plurality of mold cavities and cooled, thereby forming a molded natural resin. With the plurality of mold cavities arranged in an array, resin from an injection molding machine may flow through a runner system and a gate into a first cavity. Upon substantially filling the first cavity, the resin may flow through a sub-gate and into an adjacent cavity, eliminating the need for a second runner system.

In a preferred embodiment, a system of molding edible/digestible animal chews is provided that may result in increased productivity and reduced operating costs. Consistent with the present invention, animal chews may be molded from natural resins that may be made to flow under conditions of elevated temperature and can be molded and cooled into a desired shape. Natural resins consistent with the present invention may include casein; starch, such as potato starch, vegetable starch; vegetable matter; comminuted rawhide; and denatured, partially hydrolyzed collagen and mixtures thereof. The resins may be mixed with water and molded to provide an animal chew or toy containing between 1-40% wt. water after molding relative to the resin, more preferably 5-20% by weight moisture. Preferably, the natural resins may be injection molded into a mold including multiple cavities.

More specifically, the present invention provides a system for molding animal chews of "natural resins" that are edible/digestible, the process and apparatus for which may provide a reduced amount of runner material that feeds the multiple cavities. Such natural resins may be further combined with desired attractants and/or flavorings, colorants, etc.

Consistent with the present invention, the system for molding animal chews includes plasticating (softening for use in a melt-processing operation) natural resin and any desired additives, for example, using a screw-type injection molding apparatus. The plasticated natural resin may then be injected into a mold containing multiple cavities, each defining a desired shape for the animal chew. Injection molding of the natural resin may preferably be accomplished in an injection molding machine at temperatures between about 150 degrees F. to about 400 degrees F, and pressures of about 1000 psi. to about 2500 psi., depending upon the injection molding machine used, the particular mold, the size of the chew being molded, as well as the specific material from which the chew is being molded.

Consistent with one representative example, the natural resin may be a starch, which must be combined with water to form a mixture that is suitable for melt processing techniques. In that regard, attention is directed at commonly owned U.S. Pat. No. 6,159,516, the teachings of which are incorporated by reference. There is disclosed a preferred process for forming starch into a molded article. The disclosed process makes use of melt processing techniques and includes combining starch and water wherein the water content is in the range of 20-40% by weight with respect to that of the starch. The starch water mixture may be introduced into an extruder that heats the mixture and discharges a product having a water content that is less than the water content of the mixture entering the extruder. The product may then be introduced into an injection molding machine and injection molded and cooled to form a molded article wherein the water content is at or below 20% by weight.

In one particular exemplary process of manufacturing an animal chew toy consistent with the present invention, starch and water are first combined wherein the water content is in the range of 20-40% wt. with respect to that of the starch. The mixture is introduced into a vented barrel extruder to form extruded beads, the beads having water content upon discharge that is less than the water content of the mixture entering the extruder. The extrusion process may be followed by introduction of the extruded bead into a heated injection molding machine containing a mold and injection molding and cooling to form a molded article. The molded article desirably has a water content that is at or below 20% wt., and preferably in the range of 1-20% wt., and more preferably 5-20% by weight.

The injection molding machine includes a hopper feed section, a barrel, and an output nozzle, including a plurality of heating zones on the barrel extending from the hopper section to the nozzle. The plurality of heating zones may be set with the following exemplary and preferred temperature ranges: zone 1=at or below 70° F.; zone 2=at or below 150° F.; zone 3=at or below about 300° F.; zone 4=at or below 375° F. It should be pointed out that, in connection with the above exemplary process, the barrel temperature profile may conveniently be achieved by the use of cooling coils placed about the barrel of the injection molding machine. Such coils may comprise copper cooling coils containing circulating water.

The starch may be injected into a mold, wherein the mold itself may be cooled to about 35-65° F. The mold may include a plurality of cavities, each defining the desired shape of the molded chew or toy. After the molded article has cooled sufficiently to maintain its shape outside of the mold, the molded article may be ejected from the mold. Consistent with the present invention the mold may include an array of multiple cavities for providing a high production manufacturing capability, that is, the manufacture of a large number of articles (for instance, 288) in a single machine cycle.

An exemplary mold configured to mold natural resins is generally illustrated in FIG. 1, wherein a portion of a mold 10 is illustrated in plan view. The illustrated portion of the mold 10 is the B-plate of the mold, i.e., the mold plate conventionally including an ejection assembly. The mold 10 may include several mold cavities, for instance, 12, 12a having a complimentary geometry to the desired molded article. The illustrated plural mold cavities should be construed as being generally analogous to one another for the purposes of this description. In this case, the mold cavities 12, 12a may be in the shape of a "dog bone", however, the shape may be of most any desired shape for an animal chew or toy. Heated molding compositions may be provided from an injection molding apparatus through a sprue (not shown), then through runner 14 and gate 16 into the cavity 12. Desirably, more than one cavity may be distributed on the runner 14 in a manner that is generally balanced from a pressure drop standpoint. As shown, the runner 14 may feed drops 18, 18a that in turn feed two cavities 12, 12a through gates 16, 16a, one cavity on each side of the runner 14.

This cavity configuration is well known in the art and provides a balanced flow of resin to each of the cavities 12, 12a etc. in an array from the runner 14. However, as can be seen from FIG. 1, the amount or volume of resin which makes up the runner 14, drops 18, 18a and gates 16, 16a (as represented by the areas shown for such as illustrated in FIG. 1) may be a rather substantial portion of the amount of resin used to form the articles represented by cavities 12, 12a. Even though natural resin based articles may be reground and included in future moldings, a smaller amount of runner/drop/gate material per cavity or per article molded is preferred and may greatly impact the profitability of a molding operation where raw materials may often be the greatest single element of cost.

To reduce the amount of offal, trim, waste material or regrind formed in the operation of the subject mold, it has been found that the cavities for such animal chews or toys may be arranged in series. In other words, one cavity may feed a preferably like-shaped cavity directly through a small sub-gate, appropriately located, without the need for another large volume runner 14 and drop 18. This is illustrated in FIG. 2.

Figure 2:
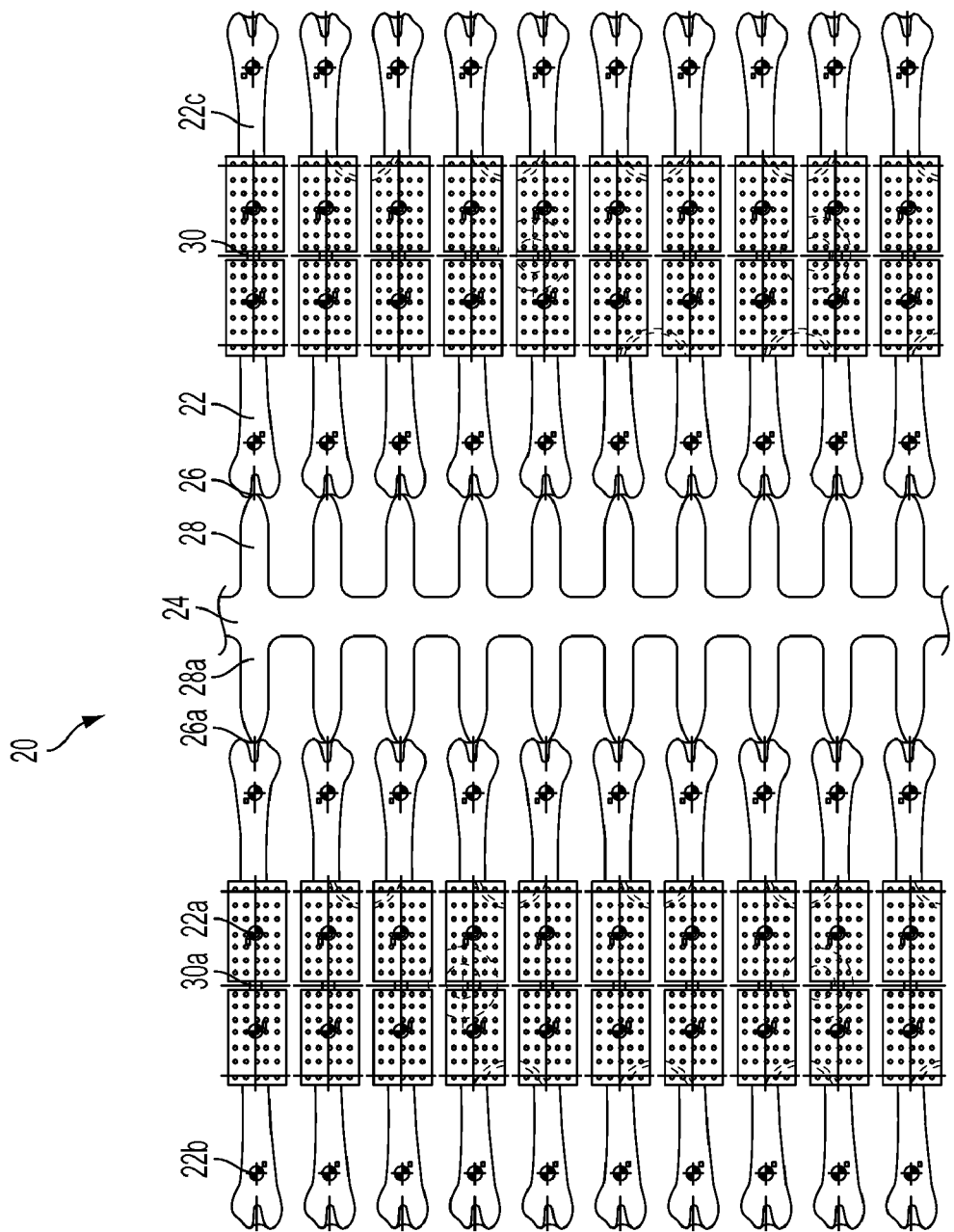
FIG. 2 illustrates a plan view of a portion of an exemplary mold, with cavities in series, according to the present invention.

FIG. 2 illustrates a preferred cavity layout for animal chews or toys in a mold plate, according to the present invention. In one embodiment the chew or toy may be shaped like a brush 100 (see FIG. 3) having a handle 120 at one end for easy holding by an animal and a generally round end portion 130 at the opposite end, the end portion including a series of projections 132 designed to clean the animals' teeth as it chews.

Figure 3:
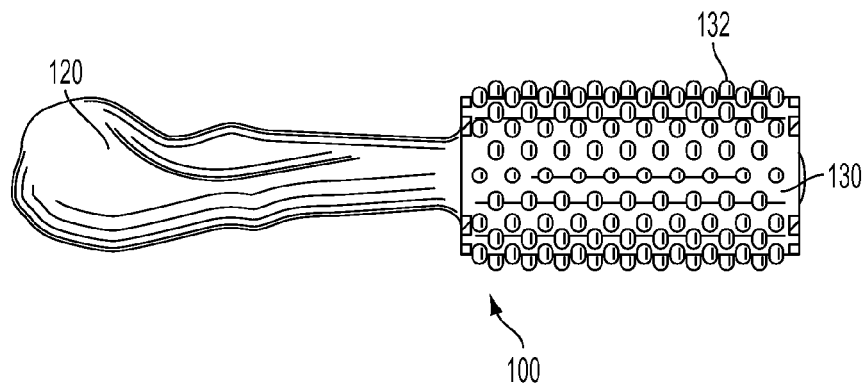
FIG. 3 is a side view of an animal chew toy molded according to the present invention.

In FIG. 2, mold portion 20 comprises one half of a matching mold set for the animal chew of FIG. 3. The mold portion 20 and the matching mold-set may be aligned to create an array of cavities (12, 12a, 12b, etc.) each shaped like the animal chew of FIG. 3 and disposed around a central runner 24. The runner may be preferably fed plasticated resin from a sprue (not shown) in fluid connection with a molding machine.

In a preferred embodiment of the present invention, to accomplish the aforementioned object of reducing the amount of runner material produced per article that is molded, it has been found that the array of cavities may be arranged in series and fed resin from one cavity to an adjacent cavity through an appropriately located sub-gate.

The sequence to fill the cavities in series with plasticated resin will now be described. Hot resin flows into runner 24 from a sprue (not shown) and into drops 28 and 28a on either side. This provides a flow of resin to gates 26 and 26a, respectively to fill out cavities 22 and 22a, respectively. Once cavities 22 and 22a are substantially filled with plasticated resin, additional resin may continue to be fed through runner 24 and through cavities 22 and 22a to sub-gates 30 and 30a respectively. Additional resin may then flow into cavities 22b and 22c respectively to fill out those cavities. At this point the animal chews may be cooled, solidified and demolded, providing four animal chews per volume of runner/drop/gate as opposed to two as shown in FIG. 1. This may result in a reduction or savings of nearly one-half the amount and cost of the runner/gate/drop material per molded article.

Figure 5:
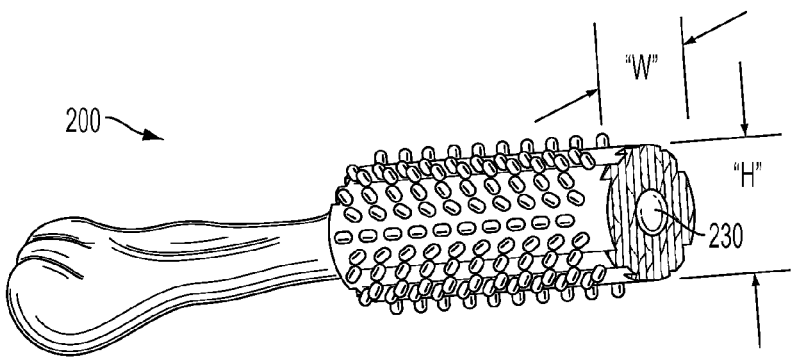
FIG. 5 is a perspective view of the animal chew toy of FIG. 2.

Animal chews and chew toys generally comprise, as shown in FIGS. 3 and 5, a length having a bulbous portion at one or both ends. Generally, the cross-section along the length may vary somewhat to provide the shape, however, the cross-section is selected so that plasticated material may flow into the cavities and through the subgate location to substantially fill all the cavities prior to completely solidifying. This may then provide a chew that is sturdy and durable for an animal to chew upon for a reasonable length of time. Thus, the cross-section of a chew toy is generally not narrow in any dimension but rather maintains a width "w" to height "h" ratio, or "w/h" of about 0.33-3.0 and all ranges and incremental values therebetween. Preferably the value of "w/h" may be in the range of 0.8-1.2. Accordingly, the molded part may be generally regular in cross-section, around a common axial centerline, for instance, generally circular, generally rectangular, generally hexagonal, generally octagonal or combinations thereof.

This shape may then provide a preferred flow channel for molding parts in series from cavities arranged in series and connected by only a sub-gate or the like. Molten resins flowing through a mold cavity behave in a phenomenon known generally as "fountain-flow". While not wanting to be bound by a particular theory, it is believed that this fountain flow through a cross-section in a mold cavity that has a "w/h" ratio as described above provides a preferred path for plasticated resin to flow through cavities arranged in series.

Figure 4:
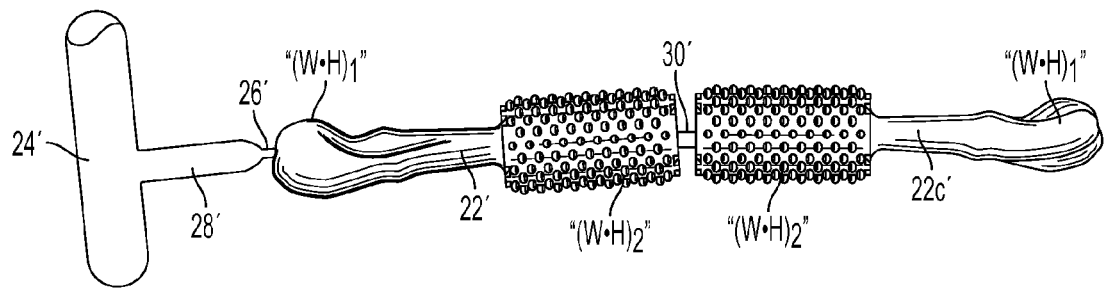
FIG. 4 is a side view of an article molded from one of the sets of cavities in series, according to the present invention.

This is shown again in FIG. 4 which illustrates a pair of exemplary animal chews as they would appear upon demolding from a pair of cavities in series, as shown in FIG. 2.

In FIG. 4, a generally round runner 24' is connected to a somewhat smaller (in cross-section) drop 28' which is connected to a first molded chew 22' by an appropriately sized gate 26'. To form the second chew 22c' in series, without the need for an additional runner system, a sub-gate 30' connects the chews. Note that it may be preferred to flow resin into the end of a cavity having the smaller cross-section and letting the resin flow to the end of larger cross-section, then reversing the order for the second chew.

In other words, it is preferred that the cavities may have a first region adjacent the gate 26 (see FIG. 2) that has a first cross-sectional area $(w \times h)_1$, and a second region adjacent subgate 30 with a second cross-sectional area $(w \times h)_2$ wherein $(w \times h)_1 < (w \times h)_2$. This provides that the larger cross-sectional region of the first cavity 22 is positioned adjacent the larger cross-sectional region of the second cavity 22C. With respect to the actual parts, as shown in FIG. 4, $(w \times h)_1$ is associated with a first region of the part and $(w \times h)_2$ is associated with a second larger region of the part so that the plasticated resin flow is from smaller cross-section to larger cross-section, then through a subgate, and then from a larger cross-section to a small cross-section.

It is believed that the use of cross-sections of such variation may allow the plasticated resin to undergo pressure-driven or "fountain" flow, wherein the plasticated resin adjacent the cool walls of the cavity may transfer thermal energy and may form a skin and the center portion of the flow front may remain hotter and may have a higher flow velocity. The flow front thus formed may continuously split along its mid plane whereby hotter plasticated resin may be continuously fed near the center of the cross-section of the cavity where the gate and sub-gate are preferably located. This may then assist in providing a direct path for the hottest resin to reach the second cavity 22c through sub-gate 30.

Along with the reduction in runner system material afforded by the present invention, an increase in productivity may also be realized. Less runners and drops may provide an increased area in the mold set for additional cavities to mold more articles in a single machine cycle. Further, there may be lower costs attendant with the trimming and removal of the runner system.

FIG. 5 is a perspective view of an alternate animal chew toy 200 showing a gate vestige 230 centrally located at the end of the chew.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. A method of molding resin, comprising:
   providing a mold having a plurality of cavities, wherein said mold includes two mold parts which may be opened and closed;
   providing a resin and plasticating said resin in a heated injection molding machine;
   providing a runner system which fluidly connects said injection molding machine with a first cavity through a gate;
   providing a sub-gate between said first cavity and a second cavity, the first and second cavity located in series along a common axial centerline, the first and second cavities being like-shaped;
   wherein said first cavity has a width "$w_1$" and height "$h_1$" and a "$(w/h)_1$" ratio of about 0.33-3.0 and said second cavity has a width "$w_2$" and height "$h_2$" and a "$(w/h)_2$" ratio of about 0.33-3.0 wherein said first cavity has a first region adjacent said gate that has a first cross-sectional area $(w \times h)_1$, and a second region adjacent said subgate with a second cross-sectional area $(w \times h)_2$ wherein $(w \times h)_1 < (w \times h)_2$ and said second cavity has a first region adjacent said subgate that has a first cross-sectional area $(w \times h)_2$, wherein $(w \times h)_2 > (w \times h)_1$;
   injecting said resin through said runner system and into said first cavity at a pressure in the range of about 1000 psi to about 2500 psi to substantially fill said first cavity and continuing to inject resin through said sub-gate into said second cavity; and
   cooling said resin thereby forming a molded resin.

2. The method of claim 1, wherein the molded resin is selected from the group consisting of casein, starch, vegetable matter, comminuted rawhide, collagen, wheat gluten, simple carbohydrates, complex carbohydrates and mixtures thereof.

3. The method of claim 1, wherein said first and said second cavities have a common axial center line and said gate and said sub-gate each are located substantially along said center line.

4. The method of claim 2, wherein molded natural resin comprises an animal chew or animal toy.

5. The method of claim 2, wherein said molded natural resin has a water content in the range of 5-20% by weight.

6. A mold for sequentially forming a plurality of animal chew toys, said mold comprising:
   a first mold part;
   a second mold part opposite to and in mating alignment with said first mold part so as to define a plurality of mold cavities connected by a runner system for receiving plasticated resin from a molding machine;
   said plurality of cavities including at least a first cavity and a second cavity, the first and second cavities being like-shaped;
   wherein said first cavity has a width "$w_1$" and height "$h_1$" and a "$(w/h)_1$" ratio of about 0.33-3.0 and said second cavity has a width "$w_2$" and height "$h_2$" and a "$(w/h)_2$" ratio of about 0.33-3.0;
   said runner system comprising a main runner and at least one gate capable of feeding said first cavity,
   wherein said first cavity and said second cavity are located in series along a common axial centerline wherein said first cavity and said second cavity are fluidly connected by a sub-gate and wherein said first cavity has a first region adjacent said gate that has a first cross-sectional area $(w \times h)_1$, and a second region adjacent said subgate with a second cross-sectional area $(w \times h)_2$ wherein $(w \times h)_1 < (w \times h)_2$ and said second cavity has a first region adjacent said subgate that has a first cross-sectional area $(w \times h)_2$, wherein $(w \times h)_2 > (w \times h)_1$.

7. The mold of claim 6 wherein said plurality of animal chew toys comprise molded natural resin.

8. The mold of claim 7 wherein the molded natural resin is selected from the group consisting of casein, starch, vegetable matter, comminuted rawhide, collagen and mixtures thereof.

9. The mold of claim 7 wherein said molded natural resin has a water content in the range of 5-20% by weight.

* * * * *